(No Model.)

F. R. PATCHETT.
HOG TRAP.

No. 491,810. Patented Feb. 14, 1893.

ATTEST:
Geo. H. Arthur
James Cavallin

INVENTOR:
Frank R. Patchett,
by Robert Burns
Attorney.

UNITED STATES PATENT OFFICE.

FRANK R. PATCHETT, OF REDDICK, ILLINOIS.

HOG-TRAP.

SPECIFICATION forming part of Letters Patent No. 491,810, dated February 14, 1893.

Application filed November 2, 1892. Serial No. 450,784. (No model.)

*To all whom it may concern:*

Be it known that I, FRANK R. PATCHETT, a citizen of the United States, residing at Reddick, in the county of Kankakee and State of Illinois, have invented a certain new and useful Improvement in Hog-Traps; and I do hereby declare the following to be a full, clear, and exact description of the same, reference being had to the accompanying drawings, forming part of this specification.

The present invention relates to that class of hog traps provided with a narrow passageway for the animal, and a holding mechanism at the end thereof, to catch and hold the animal by its neck, while the operation of snouting, ear marking, &c., is being performed.

Figure 1:
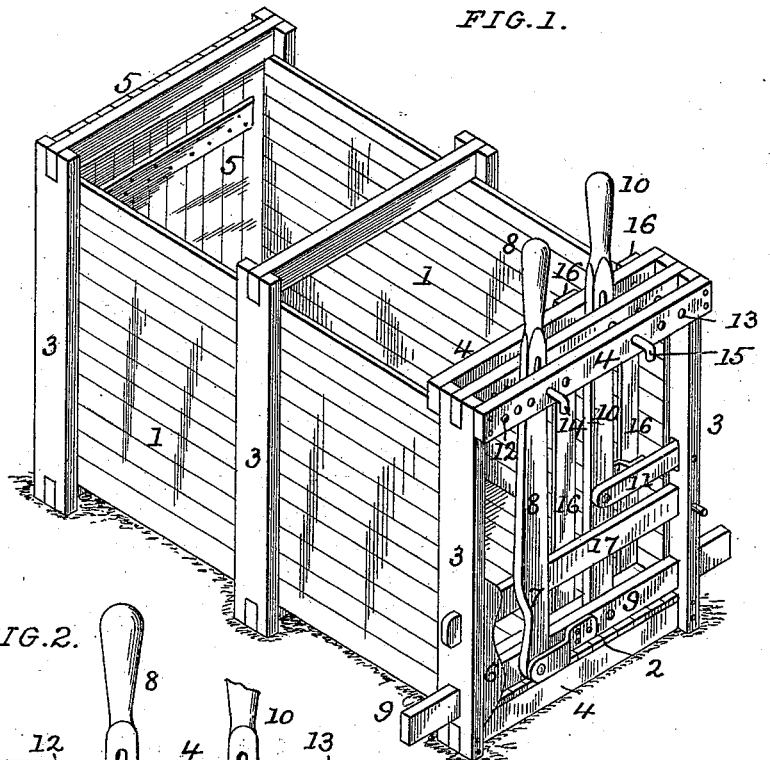
Figure 2:
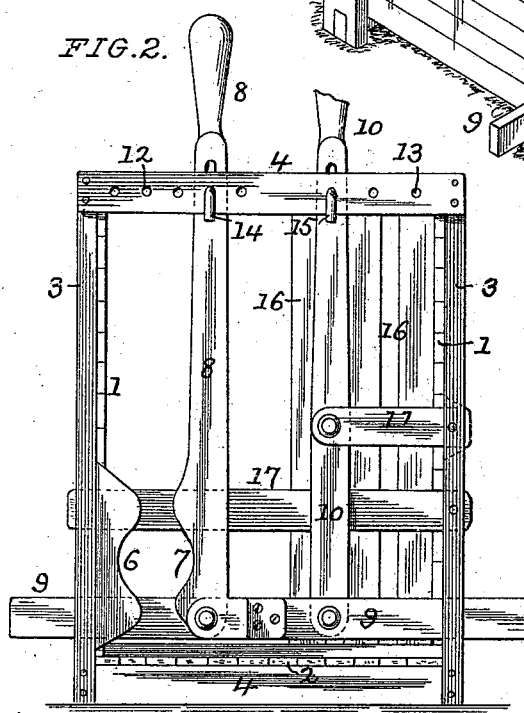
Figure 3:
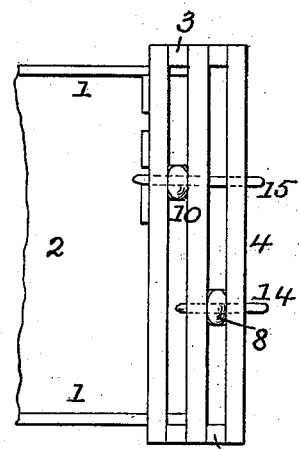

The object of the present improvement is to provide a simple and efficient grasping or holding mechanism for such class of traps embodying the features of a ready, rapid and convenient adjustment of the parts, to suit different sizes of animals operated upon. I attain such object by the construction and arrangement of parts illustrated in the accompanying drawings in which:

Figure 1, is a perspective view of a hog trap, embodying my present improvements; Fig. 2, an end elevation of the same, illustrating the holding or grasping mechanism; and, Fig. 3, a top plan of the portion of the trap at which the holding or grasping mechanism is located.

Similar numerals of reference indicate like parts in the several views.

As represented in the drawings the main body of the trap will consist of a narrow passage-way, composed of side walls 1, and bottom 2, framed together in any usual and well known manner by means of a series of vertical rails 3, and cross rails 4; it being preferable to frame or connect the different parts together by bolts or dowel pins, so as to enable the parts to be disconnected for shipment, &c., in a "knock down" condition. At one end of such body is a door 5, by which the animal is confined within the trap, and at the other end the holding or grasping mechanism, which in the present invention consists of the following mechanism:

6, is a stationary jaw at one side of the frame, and 7 the movable or adjustable jaw formed on the edge of the handle lever 8, that extends between and is guided near its top in a transverse slot formed by an adjacent pair of the cross rails 4, the lower end of said lever 8 being pivoted to a transverse horizontally arranged and transversely sliding bar 9, that is guided by guide mortises in the vertical rails 3, as shown, and which is capable of adjustment to vary the size of the opening between the grasping or holding jaws 6, and 7, by means of a hand lever 10, fulcrumed on a pivot link 11, and connected to the sliding bar, as illustrated in Figs. 1 and 2. The upper end of the hand lever 10 is guided in a similar manner to the hand lever 8, in a transverse slot formed by an adjacent pair of cross rails 4, and both levers are locked to their required adjustment by any suitable locking mechanisms, preferably a series of holes 12 and 13 in the rails, and locking pins 14 and 15, that pass through said holes and through a vertical slot in each lever, as illustrated in Fig. 2.

16, is a partition arranged inside of the holding or grasping mechanism, and between the lever 10 and link 11, and the interior of the trap, so as to prevent the introduction or contact of the animal's head therewith.

17, is a removable cross rail or bar passing through mortises in the vertical rails 3, and arranged mid-height of the trap, this rail is intended for use, when the trap is employed in the dehorning of calves, and the performance of any other usual operation on the larger sized animals.

Having thus fully described my said invention what I claim as new and desire to secure by Letters Patent, is:

1. In a hog trap the combination with the body or passage-way, and holding or grasping mechanism, composed of a stationary jaw 6, an adjustable jaw 7, formed at the side of a lever 8, the lever 8 having its fulcrum on a transversely adjustable slide bar 9, and a lever 10 for adjusting the slide bar 9, substantially as set forth.

2. In a hog trap the combination with the body or passage-way, and holding or grasping mechanism composed of a stationary jaw 6, an adjustable jaw 7 formed at the side of a lever 8, the lever 8 having its fulcrum on a transversely adjustable slide bar 9, and a lever 10, and fulcrum link 11, for adjusting the slide bar 9, and locking mechanism for the levers 8, and 10, substantially as set forth.

In testimony whereof witness my hand this 24th day of October, 1892.

FRANK R. PATCHETT.

In presence of—
H. B. STATES,
FRANK MCBRIAN.